(12) United States Patent  
Otomo et al.

(10) Patent No.: US 11,372,415 B2
(45) Date of Patent: Jun. 28, 2022

(54) VEHICLE CONTROL SYSTEM (71) Applicant: Yazaki Corporation, Tokyo (JP)

(72) Inventors: Kentaro Otomo, Shizuoka (JP); Yu Kawahara, Shizuoka (JP); Atsushi Ishibashi, Shizuoka (JP); Masaki Saito, Shizuoka (JP); Shinichi Okamoto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/116,238

(22) Filed: Dec. 9, 2020

(65) Prior Publication Data

US 2021/0089038 A1    Mar. 25, 2021

Related U.S. Application Data (63) Continuation of application No. PCT/JP2019/004049, filed on Feb. 5, 2019.

(30) Foreign Application Priority Data

Jun. 12, 2018   (JP) .............................. JP2018-111939

(51) Int. Cl.
G05D 1/02      (2020.01)
B60W 60/00     (2020.01)
(Continued)

(52) U.S. Cl.
CPC ......... *G05D 1/0212* (2013.01); *B60W 60/001* (2020.02); *G08G 1/0969* (2013.01);
(Continued)

(58) Field of Classification Search
CPC .............. G05D 1/0212; B60W 60/001; B60W 2540/225; B60W 50/082; B60W 50/085;
(Continued)

(56) References Cited

U.S. PATENT DOCUMENTS 10,553,110 B2* 2/2020 Fowe ..................... G08G 1/052
2009/0237644 A1* 9/2009 Uechi ................... B60W 30/10
356/29

(Continued)

FOREIGN PATENT DOCUMENTS

JP    2004-061259 A    2/2004
JP    2017-021731 A    1/2017
(Continued)

*Primary Examiner* — Rodney A Butler
(74) *Attorney, Agent, or Firm* — Sughrue Mion, PLLC (57) ABSTRACT

In a vehicle control system, when an occupant visually recognizes a signboard and signboard course information is included in signboard information corresponding to the signboard, the signboard information is displayed on a display device. When the signboard course information out of the signboard information is visually recognized continuously, a control device generates course information based on the signboard course information. The generated course information is output to a vehicle control ECU, and course change processing based on the course information is performed by the vehicle control ECU.

2 Claims, 6 Drawing Sheets (51) Int. Cl.
  *G08G 1/09* (2006.01)
  *G08G 1/0968* (2006.01)
  *G08G 1/0969* (2006.01)
  *B60K 35/00* (2006.01)
  *B60R 11/02* (2006.01)

(52) U.S. Cl.
  CPC ........ *G08G 1/096877* (2013.01); *B60K 35/00* (2013.01); *B60K 2370/166* (2019.05); *B60R 11/0229* (2013.01); *B60W 2540/225* (2020.02); *G08G 1/096861* (2013.01)

(58) Field of Classification Search
  CPC ........... B60W 50/14; B60W 2050/146; B60W 2540/215; B60W 2555/60; G08G 1/096877; G08G 1/0969; G08G 1/096861; G08G 1/09623; G08G 1/096838; B60K 35/00; B60K 2370/166; B60K 2370/149; B60K 2370/175; B60K 2370/21; B60K 37/06; B60R 11/0229; B60R 2300/103; B60R 2300/207; B60R 2300/307; B60R 1/00; G01C 21/36; G09B 29/00

See application file for complete search history.

(56) References Cited

U.S. PATENT DOCUMENTS

| | | |
|---|---|---|
| 2015/0332104 A1* | 11/2015 | Kapach ................ G06V 20/582 382/104 |
| 2017/0151958 A1 | 6/2017 | Sakuma |
| 2017/0154228 A1* | 6/2017 | Moritani ............... B60K 37/06 |
| 2018/0244286 A1 | 8/2018 | Sakai et al. |
| 2018/0260639 A1* | 9/2018 | Kapach ................ G06V 20/582 |
| 2018/0362011 A1* | 12/2018 | Picron .................. B60W 10/02 |
| 2019/0325235 A1* | 10/2019 | Stenneth .............. G08G 1/0112 |

FOREIGN PATENT DOCUMENTS

| | | |
|---|---|---|
| WO | 2015/141308 A1 | 9/2015 |
| WO | 2017/072956 A1 | 5/2017 |

* cited by examiner

VEHICLE CONTROL SYSTEM

CROSS-REFERENCE TO RELATED APPLICATION(S)

This application is a continuation application of International Application No. PCT/JP2019/004049 filed on Feb. 5, 2019 which claims the benefit of priority from Japanese Patent Application No. 2018-111939 filed on Jun. 12, 2018 and designating the U.S., the entire contents of which are incorporated herein by reference.

BACKGROUND OF THE INVENTION

1. Field of the Invention

The present invention relates to a vehicle control system.

2. Description of the Related Art

Conventionally, there has been a vehicle control system performing course control that controls a course along which a vehicle travels such as lane keeping control and adaptive cruise control, for example. Meanwhile, in order to detect a state of an occupant, a sightline-state imaging device that detects a sightline state that is a state of the sightline of the occupant of the vehicle has been provided (for example, Japanese Patent Application Laid-open No. 2017-021731).

Incidentally, there may be a case where, in a state in which the course control is performed, the occupant wants to change the course from the current course by looking at a signboard placed outside the vehicle. In this case, there is a problem in that the operation of the occupant is complicated because the occupant needs to perform the course change by changing from the state in which the course control is performed to a manual driving state in which the occupant himself/herself operates the vehicle.

SUMMARY OF THE INVENTION

The present invention has been made in view of the above-described point, and an object of the invention is to provide a vehicle control system capable of automatically performing the course change with simple operation of the occupant.

In order to achieve the above mentioned object, a vehicle control system according to one aspect of the present invention includes a front imaging device configured to image a front of a vehicle; a signboard position detector configured to detect, based on a front image imaged by the front imaging device, a position of a signboard in the front image; a sightline-state imaging device configured to image eyes of an occupant of the vehicle; a sightline state detector configured to detect, based on a sightline image imaged by the sightline-state imaging device, a sightline state that is a state of a sightline; a first sightline determination unit configured to determine, based on the position of the signboard and on the sightline state, whether the sightline is located at a signboard region corresponding to the signboard in the front image; a signboard-information acquisition unit configured to acquire signboard information corresponding to the signboard from map information, when it is determined that the sightline is located at the signboard region; a signboard-information determination unit configured to determine, based on the signboard information, whether signboard course information that is one or more pieces of information on a course of the vehicle is included in the signboard information; a display device configured to display the signboard information when it is determined that the signboard information includes the signboard course information; a second sightline determination unit configured to determine, based on the signboard information displayed on the display device and the sightline state, whether the sightline is located at a signboard-course information region corresponding to the signboard course information in the signboard information; a selection unit configured to select the signboard course information corresponding to the signboard-course information region at which the sightline is located when it is determined that the sightline is located at the signboard-course information region by the second sightline determination unit; an input unit configured to make an input corresponding to course change determination when it is determined that course change to a course based on the signboard course information that the occupant has selected by the selection unit is performed; and a course change processor configured to perform course change processing based on the signboard course information when the input corresponding to the course change determination is made to the input unit.

According to another aspect of the present invention, in the vehicle control system, it is possible to configured that when the signboard course information is selected, the display device changes a display form of the signboard information into the display form in which the selected signboard course information identifiable.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

An exemplary embodiment of a vehicle control system according to the present invention will be described in detail with reference to the accompanying drawings. The invention, however, is not intended to be limited by the embodiment. The constituent elements in the following embodiment include elements easily achieved by a person skilled in the art or elements being substantially the same as the constituent elements. Furthermore, various omissions, substitutions, or modifications of the constituent elements in the following embodiment may be made without departing from the spirit of the invention.

EMBODIMENT

Figure 1:
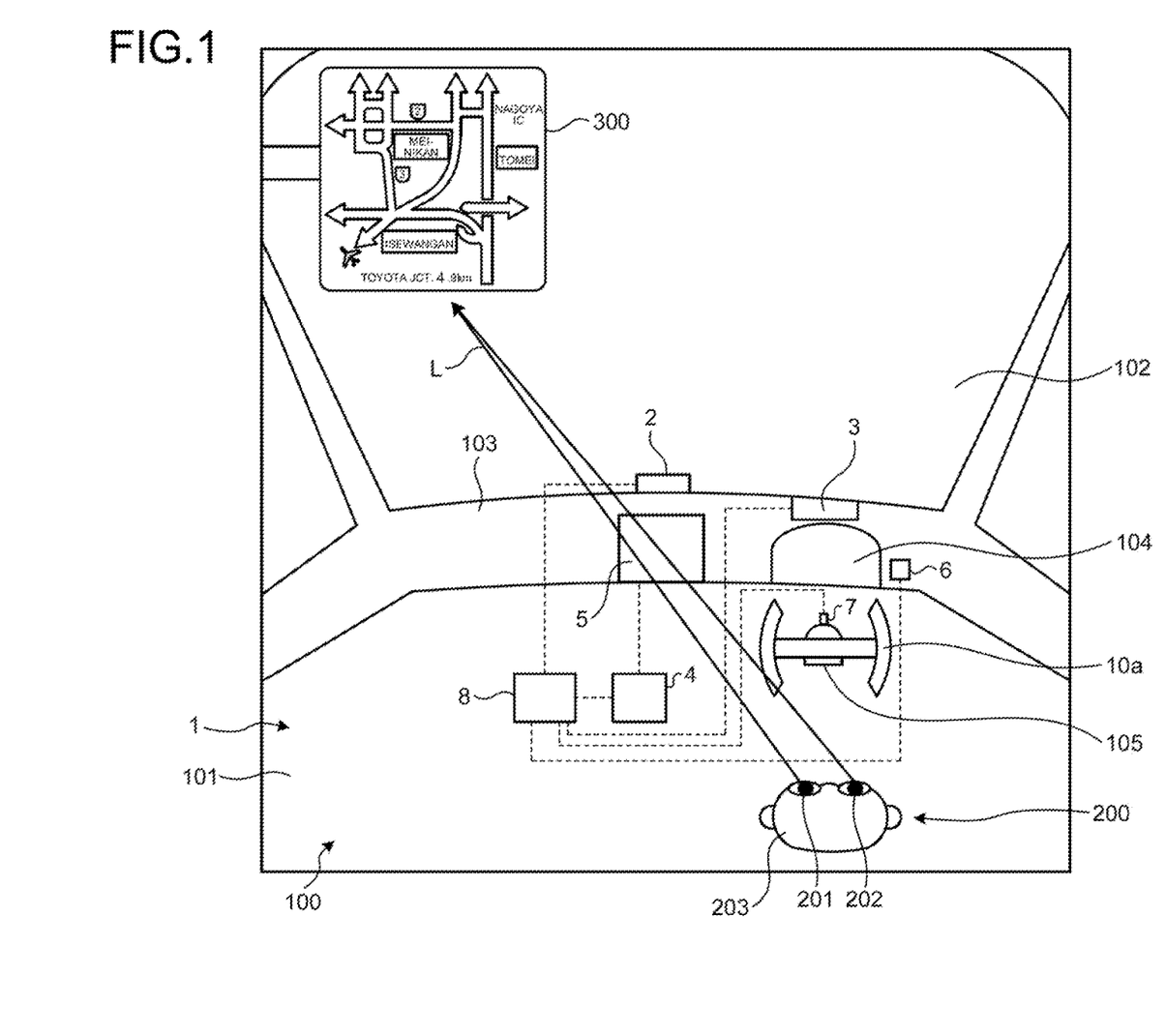
FIG. 1 is a diagram illustrating a configuration example of a vehicle control system according to an embodiment.
Figure 2:
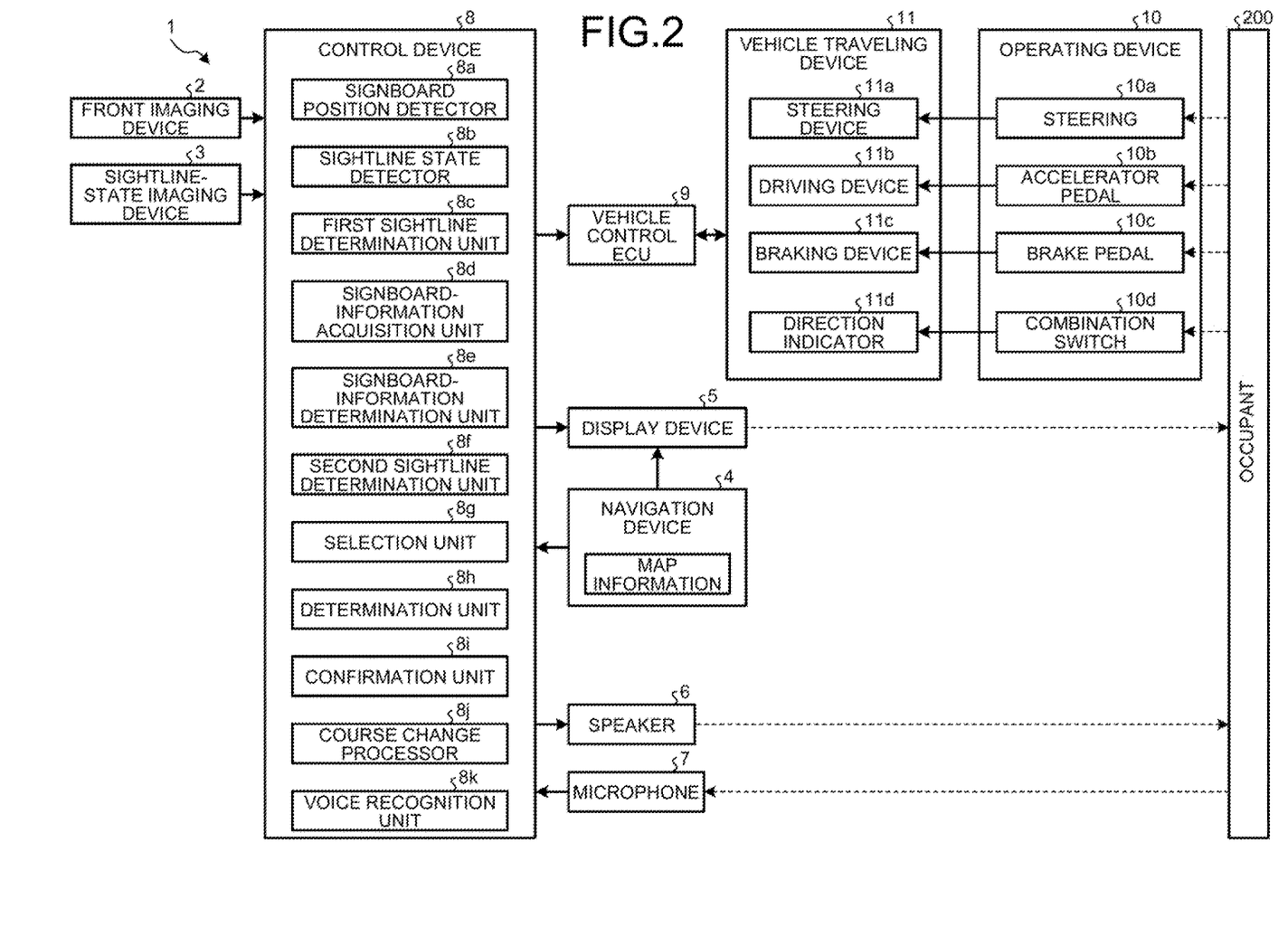
FIG. 2 is a block diagram of the vehicle control system in the embodiment.
Figure 3:
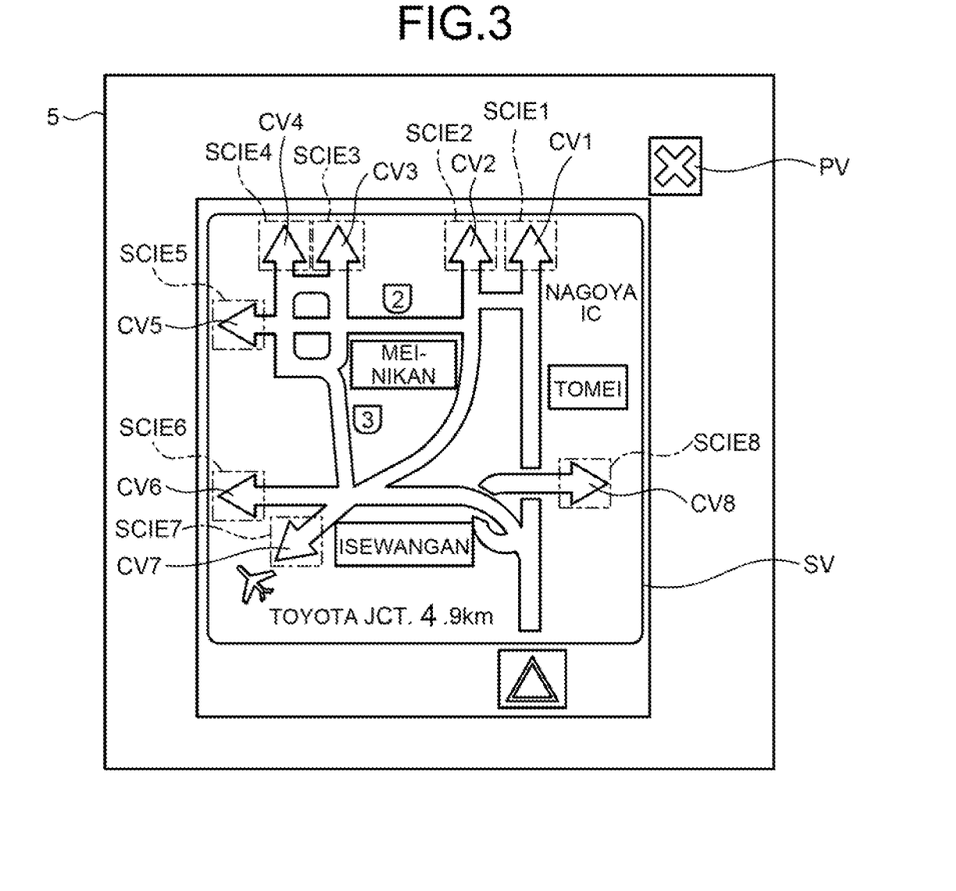
FIG. 3 is a diagram illustrating signboard information (normal display form) displayed on a display device.
Figure 4:
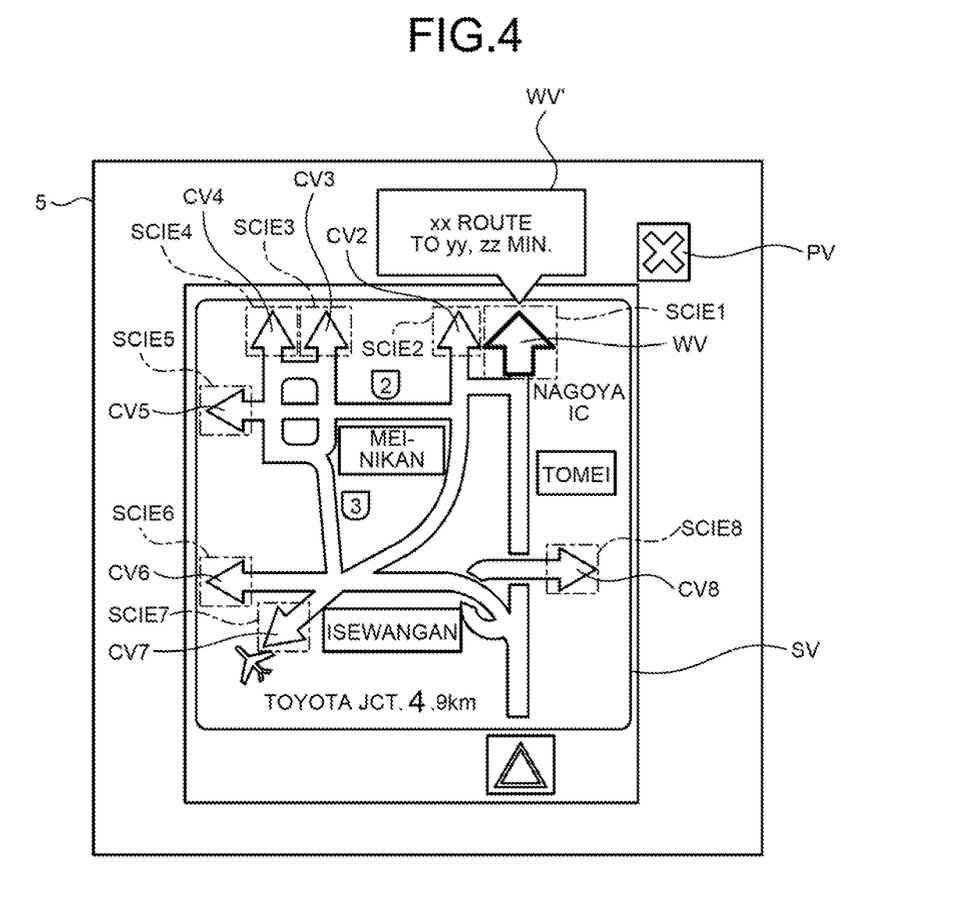
FIG. 4 is a diagram illustrating the signboard information (identification display form) displayed on the display device.
Figure 5:
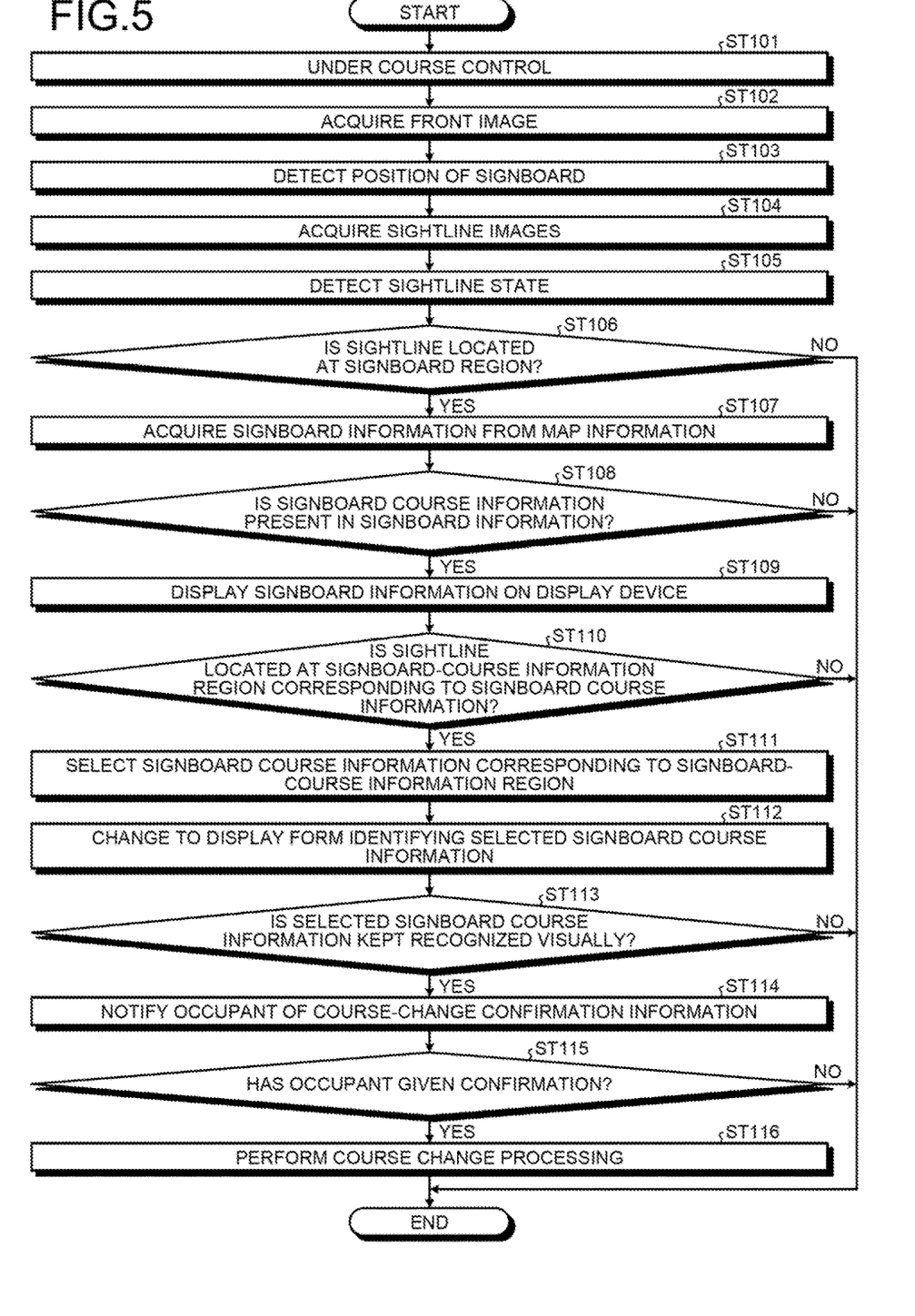
FIG. 5 is a flow diagram of the vehicle control system in the embodiment.
Figure 6:
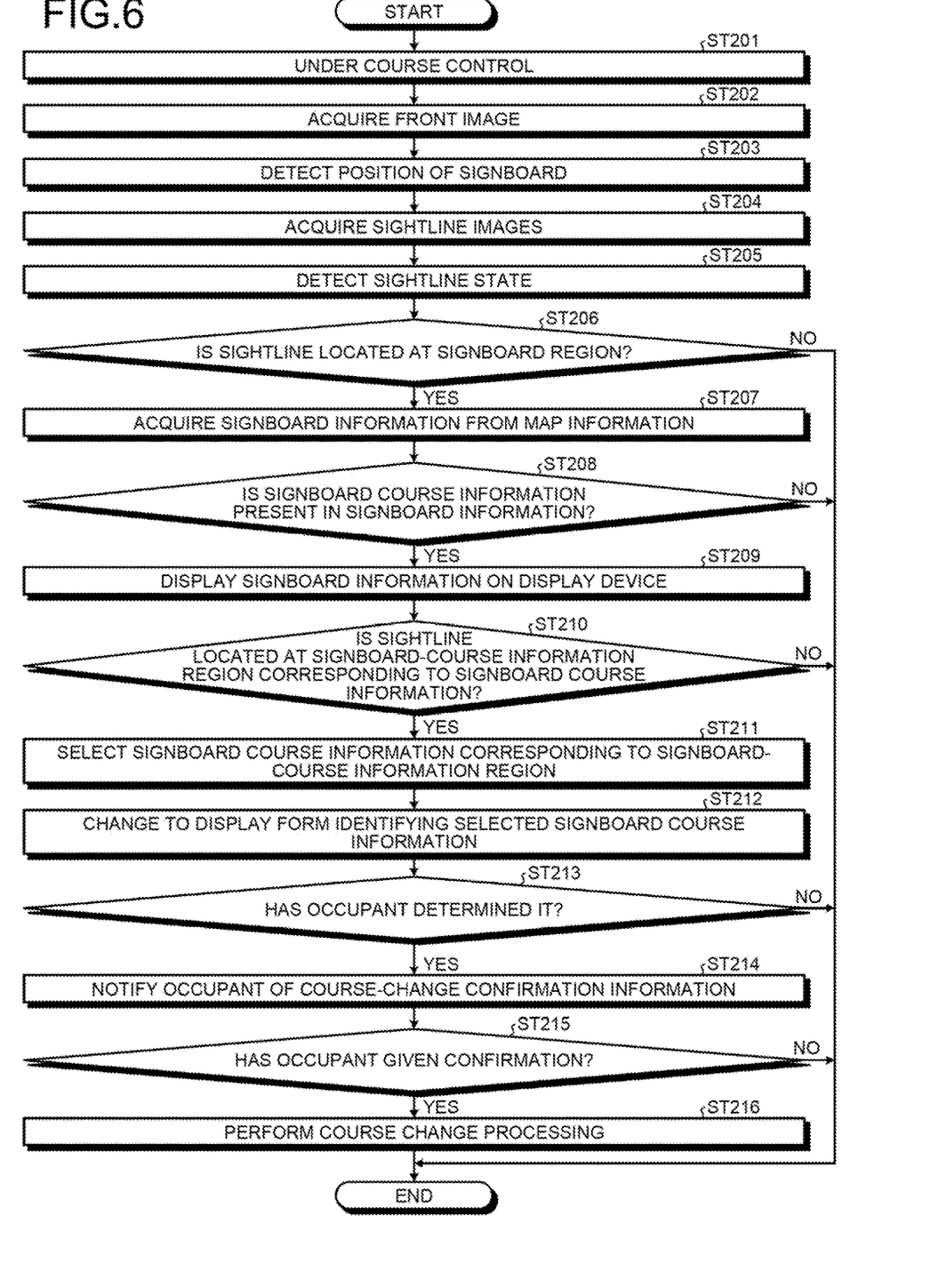
FIG. 6 is a flow diagram of the vehicle control system according to a modification.

A vehicle control system according to an embodiment will be described. FIG. 1 is a diagram illustrating a configuration example of a vehicle control system in the embodiment. FIG. 2 is a block diagram of the vehicle control system in the embodiment. FIG. 3 is a diagram illustrating signboard information (normal display form) displayed on a display device. FIG. 4 is a diagram illustrating the signboard information (identification display form) displayed on the display device. FIG. 5 is a flow diagram of the vehicle control system in the embodiment. FIG. 6 is a flow diagram of the vehicle control system according to a modification.

A vehicle control system 1 according to the present embodiment is applied to, for example, a vehicle 100 capable of automatic driving only or of automatic driving and manual driving and, as illustrated in FIG. 1, is provided in a cabin 101. In the cabin 101, an instrument panel 103 is provided on the lower side of a windshield 102 located in the front of the vehicle. On the instrument panel 103, a meter 104 is provided. On the rear side of the vehicle farther than the instrument panel 103, provided is a steering 10a, which will be described later, rotatively supported by a steering column 105. An occupant 200 in the present embodiment is a driver who sits on a seat not depicted provided behind the steering 10a in the direction of the vehicle, and can visually recognize the instrument panel 103, and the front of the vehicle 100 via the windshield 102. The vehicle control system 1, as illustrated in FIG. 1 and FIG. 2, includes a front imaging device 2, a sightline-state imaging device 3, a navigation device 4, a display device 5, a speaker 6, a microphone 7, a control device 8, a vehicle control ECU 9, an operating device 10, and a vehicle traveling device 11.

The front imaging device 2 images the front of the vehicle 100. The front imaging device 2 is fitted to a position where the front of the vehicle 100 can be imaged and, in the present embodiment, is fitted to the instrument panel 103. The front imaging device 2 is electrically coupled to the control device 8 and outputs to the control device 8 a captured image as a front image FV. The front imaging device 2 is a camera and generates a plurality of consecutive front images FV. The front image is actual scenery in the front of the vehicle 100 including a visual recognition object such as a signboard 300 that is visible when the occupant 200 visually recognizes the front. The front imaging device 2 may generate a moving image by continuously imaging still images.

The sightline-state imaging device 3 images the eyes of the occupant 200 of the vehicle 100. The sightline-state imaging device 3 is an input unit, and when the occupant 200 determines to perform course change, an input corresponding to the course change determination is made. The sightline-state imaging device 3 in the present embodiment images a sightline L from the viewpoints of two eyes 201 and 202 of the occupant 200 by using infrared. The sightline-state imaging device 3 is fitted to, out of the cabin 101, a position where the respective eyes 201 and 202 can be detected and, in the present embodiment, is fitted to the instrument panel 103. The sightline-state imaging device 3 is electrically coupled to the control device 8 and outputs to the control device 8 a captured image as a sightline image. The sightline-state imaging device 3 has an infrared LED not depicted and an infrared camera. The infrared LED emits infrared light that can be imaged by the infrared camera. The infrared LED irradiates a face 203 including the respective eyes 201 and 202 of the occupant 200 with the infrared light. The infrared camera images at least the respective eyes 201 and 202 on the basis of the infrared light reflected on the face 203, and generates a plurality of consecutive sightline images LV.

The navigation device 4 acquires at least current location information on the vehicle 100, and has map information MI. The navigation device 4 acquires, based on the positional information and the like from a global positioning system (GPS) satellite, the current location information on the vehicle 100. The navigation device 4 displays, based on the current location information on the vehicle 100, the map information MI about the periphery of the vehicle 100, out of the map information MI, on the display device 5 which will be described later.

Furthermore, the navigation device 4, when a destination is set by the occupant 200, guides a route up to the destination to the occupant 200, by the display on the display device 5, the sound from the speaker, and the like. The navigation device 4 is electrically coupled to the control device 8, and the control device 8 can acquire the map information MI. The map information MI includes the location and signboard information SI of a signboard 300 of at least the periphery of the road that the vehicle 100 travels which the occupant 200 can visually recognize from the cabin 101. The signboard information SI includes various information, and in the signboard information SI corresponding to the signboard 300 in which the information on the course of the vehicle 100 is included, the signboard information SI includes signboard course information SCI. The signboard information SI in the present embodiment is displayed on the display device 5 as a signboard image SV corresponding thereto. The signboard course information SCI is the information on the course of the vehicle 100. The signboard course information SCI in the present embodiment is displayed on the display device 5 as a course image CV corresponding thereto. Examples of the course image CV include characters, graphics such as arrows, symbols, and the like that can be recognized by the occupant 200 to be the information relating to the course. The map information MI may be acquired from the outside as appropriate by a communication device installed on the vehicle 100.

The display device 5 can be visually recognized by the occupant 200. The display device 5 displays the signboard information SI, when it is determined that, in a signboard-information determination unit 8e which will be described later, the signboard information SI includes the signboard course information SCI. The display device 5 in the present embodiment displays, as illustrated in FIG. 3, the signboard image SV corresponding to the signboard information SI including the course image CV corresponding to the signboard course information SCI. Furthermore, when the signboard course information SCI is selected, the display device 5 changes a display form of the signboard information SI into the display form in which the selected signboard course information SCI can be identified. The display device 5 in the present embodiment, as illustrated in FIG. 4, makes the display form in which the selected signboard course information SCI can be identified, by superimposing a warning image WV on the course image CV corresponding to the signboard course information SCI as the display form of the signboard information SI. The warning image WV only needs to be an image that can attract the attention to the course image CV corresponding to the signboard course information SCI selected by the occupant 200, and it is characters, graphics such as arrows, symbols, and the like and may be displayed in normal display or blinking display. The display device 5 in the present embodiment is provided in the instrument panel 103, and is a monitor such as a liquid crystal panel, an organic EL panel, and the like. The display device 5 is electrically coupled to the control device 8, and display control is made by the control device 8. The display device 5 may have a touch panel function, and may be a head-up display that displays display information on the windshield 102 as a virtual image, or a head-up display that displays the display information on a combiner not depicted.

The speaker 6 is a notification device, and as illustrated in FIG. 1 and FIG. 2, outputs notification information that the occupant 200 can recognize on the basis of the sense of hearing. The speaker 6 is electrically coupled to the control device 8, and audio output control is made by the control device 8. The speaker 6 in the present embodiment outputs audio information that the occupant 200 can recognize for the purpose of, at a confirmation unit 8i, final confirmation of changing the course to the course based on the determined signboard course information SCI with the occupant 200.

The microphone 7 is a device to which the voice of the occupant 200 is input. The microphone 7 is an input unit and, when the occupant 200 determines to perform course change, an input corresponding to the course change determination is made. The microphone 7 is electrically coupled to the control device 8, and outputs the audio information based on the voice uttered by the occupant 200 to the control device 8.

The control device 8 performs course change processing. The control device 8 in the present embodiment selects, determines, and confirms the course on the basis of the sightline L of the occupant 200. The control device 8 includes a signboard position detector 8a, a sightline state detector 8b, a first sightline determination unit 8c, a signboard-information acquisition unit 8d, a signboard-information determination unit 8e, a second sightline determination unit 8f, a selection unit 8g, a determination unit 8h, the confirmation unit 8i, a course change processor 8j, and a voice recognition unit 8k. Each of the units is one function that the control device 8 has. The hardware configuration of the control device 8 is the same as the hardware configuration of a known control device 8, and includes a CPU, a RAM, and a ROM not depicted, for example.

The signboard position detector 8a detects, based on the front image FV imaged by the front imaging device 2, the position of the signboard 300 in the front image FV. The signboard position detector 8a in the present embodiment detects a signboard region SE that corresponds to the signboard 300 in the front image FV.

The sightline state detector 8b detects, based on the sightline images LV imaged by the sightline-state imaging device 3, a sightline state that is a state of the sightline L. The sightline state is the sightline L of the occupant 200 as a state in which at least the sightline L is present, and includes eye shutting of the respective eyes 201 and 202 as a state in which the sightline L is not present. The sightline state detector 8b detects the sightline L of the occupant 200 (the direction of the sightline L) on the basis of the position of the eyes 201 and 202 in a plurality of consecutive sightline images LV, and the relative position between the infrared camera and the occupant 200, and generates sightline information LI. Furthermore, based on the presence of detection of the viewpoint in the consecutive sightline images LV, the eye shutting is detected, and eye-shutting information is generated.

The first sightline determination unit 8c determines, based on the position of the signboard 300 and on the sightline state, whether the sightline L is located at the signboard region SE corresponding to the signboard 300 in the front image FV. The first sightline determination unit 8c in the present embodiment determines, based on the signboard region SE (two-dimensional coordinate) in the front image FV and on the location of the viewpoint in the front image FV based on the sightline L detected by the sightline state detector 8b, whether the occupant 200 is visually recognizing the signboard 300.

The signboard-information acquisition unit 8d, when it is determined that the sightline L is located at the signboard region SE, acquires the signboard information SI corresponding to the signboard 300 from the map information MI. The signboard-information acquisition unit 8d in the present embodiment calculates, based on the current location of the vehicle 100 and the location of the signboard 300 with respect to the vehicle 100, the position (the coordinate on the map information MI) of the signboard 300 in the map information MI, and acquires the signboard information SI at the location matching or substantially matching the calculated position of the signboard 300 in the map information MI.

The signboard-information determination unit 8e determines, based on the signboard information SI, whether one or more pieces of the signboard course information SCI are included in the signboard information SI.

The second sightline determination unit 8f, when the signboard information SI including the signboard course information SCI is displayed on the display device 5, determines whether the sightline L is located at a signboard-course information region SCIE corresponding to the signboard course information SCI in the signboard information SI, on the basis of the signboard information SI and the sightline state. The second sightline determination unit 8f in the present embodiment determines whether the occupant 200 is visually recognizing the course image CV corresponding to the signboard course information SCI displayed on the display device 5, on the basis of the signboard image SV (two-dimensional coordinate) corresponding to the signboard information displayed on the display device 5, and on the basis of the location of the viewpoint in the signboard image SV based on the sightline L that is detected by the sightline state detector 8b.

The selection unit 8g, when it is determined that the sightline L is located at the signboard-course information region SCIE at the second sightline determination unit 8f, selects the signboard course information SCI corresponding to the signboard-course information region SCIE at which the sightline L is located. The selection unit 8g in the present embodiment, as the occupant 200 visually recognizes the course image CV, selects the signboard course information SCI corresponding to the visually recognized course image CV as the signboard course information SCI that the occupant 200 selected.

The determination unit 8h determines that, as an input corresponding to the course change determination is made to the input unit by the occupant 200, the selected signboard course information SCI is the signboard course information SCI for performing the course change processing. The determination unit 8h in the present embodiment, when the selected signboard course information SCI is visually recognized continuously based on the sightline information, determines it to be the signboard course information SCI for performing the course change processing.

The confirmation unit 8i confirms, with the occupant 200, performing of the course change processing based on the signboard course information SCI for performing the course change processing determined by the determination unit 8h. The confirmation unit 8i in the present embodiment, for example, outputs in the cabin 101, by the speaker 6, course-change confirmation information XI that prompts the confirmation of the occupant 200 such as "Is this the course you would like?", and determines the presence of a response of the occupant 200 to the confirmation information.

The course change processor 8*j* performs the course change processing based on the signboard course information SCI when the input corresponding to the course change determination is made to the input unit. The course change processor 8*j* in the present embodiment generates course information CI on the basis of the signboard course information SCI that the occupant 200 confirmed in the confirmation unit 8*i*, and outputs the course information CI to the vehicle control ECU 9.

The voice recognition unit 8*k* identifies the voice of the occupant 200 input by the microphone 7 and, by comparing it with the audio information stored beforehand in a storage unit not depicted, selects the audio information corresponding to the input voice of the occupant 200.

The vehicle control ECU 9 controls a traveling state of the vehicle 100. The vehicle control ECU 9 in the present embodiment is capable of performing course control such as lane keeping control that causes the vehicle 100 to travel on a certain lane, and following travel control (adaptive cruise control) that causes the vehicle 100 to travel following a vehicle ahead with a certain inter-vehicle distance. The vehicle control ECU 9 can, based on the course information CI that is input, perform lane change from the current lane to another lane, that is, lane change control, during the lane keeping control, for example.

The operating device 10 is operated by the occupant 200 as a driver in order to manually drive the vehicle 100. The operating device 10 includes the steering 10*a*, an accelerator pedal 10*b*, a brake pedal 10*c*, and a combination switch 10*d*. The steering 10*a* is rotatively supported, and makes the vehicle 100 turn and changes a steering angle of the turning wheels (primarily, front wheels) of the vehicle 100 when rotated by hand by the occupant 200. In the steering 10*a*, the steering angle is detected by a rotation angle sensor not depicted. The accelerator pedal 10*b* is supported so as to swing freely, and makes the vehicle 100 move forward or backward by accelerating and changes the driving force of the driving wheels (primarily, front wheels or rear wheels) of the vehicle 100 when stepped on by foot by the occupant 200. In the accelerator pedal 10*b*, an accelerator stepping amount is detected by a stepping amount sensor not depicted. The brake pedal 10*c* is supported so as to swing freely, and makes the vehicle 100 decelerate and stop and changes the braking force of the all wheels of the vehicle 100 when stepped on by foot by the occupant 200. In the brake pedal 10*c*, a brake stepping amount is detected by a stepping amount sensor not depicted. The combination switch 10*d* is supported so as to swing freely, and blinks a signal lamp of a turn signal (blinker) 11*d* which will be described later when operated by hand by the occupant 200. In the combination switch 10*d*, the presence of operation of the turn signals 11*d* and/or the direction indication of the turn signals 11*d* are detected by a blinker switch not depicted. The operating device 10 is coupled to the vehicle control ECU 9 via the vehicle traveling device 11, and outputs to the vehicle control ECU 9 the amount of operation that can perform the travel control of the vehicle 100 such as the steering angle, the accelerator stepping amount, the brake stepping amount, and the presence of operation of the turn signals 11*d* and/or the direction indication thereof.

The vehicle traveling device 11 makes the vehicle 100 travel. The vehicle traveling device 11 includes a steering device 11*a*, a driving device lib, a braking device 11*c*, and the turn signals 11*d*. The steering device 11*a* is a steering device that changes the steering angle of the turning wheels of the vehicle 100 by a steering actuator such as a motor, for example. The driving device lib generates the driving force to the driving wheels of the vehicle 100, and includes a motor as a driving source, a battery that supplies electric power to the motor, a transmission that transfers the driving force from the motor to the driving wheels, and others, for example. The braking device 11*c* is a hydraulic braking device that brings brake pads into contact with a brake rotor by the hydraulic pressure generated by a braking actuator, for example. The turn signals 11*d* output direction indication information concerning the moving direction of the vehicle 100, by blinking the signal lamp as a visual system output, for example. In the vehicle traveling device 11, the amount of operation such as the steering angle, the accelerator stepping amount, the brake stepping amount, the presence of the operation of the turn signals 11*d* and/or the direction indication thereof, is input from the steering 10*a*, the accelerator pedal 10*b*, the brake pedal 10*c*, and the combination switch 10*d* to the respective steering device 11*a*, the driving device 11*b*, the braking device 11*c*, and the turn signals 11*d*, either directly or via the electrically coupled vehicle control ECU 9. In the vehicle traveling device 11, based on the amount of operation, each of the steering control, the driving control, the braking control, and the turn signal control is performed on the steering device 11*a*, the driving device 11*b*, the braking device 11*c*, and the turn signals 11*d*.

Next, the operation of the vehicle control system 1 in the present embodiment will be described. FIG. 5 is a flow diagram of the vehicle control system in the embodiment. It is assumed that the signboard 300 represents the signboard information SI in which a plurality of junctions present in the front of the traveling vehicle 100 are displayed as the signboard course information SCI.

First, in the vehicle control system 1, the lane keeping control is performed by the vehicle control ECU 9 as the course control (Step ST101). When the lane keeping control is performed, the occupant 200 is selecting the course in which the vehicle 100 goes straight on the lane currently traveling.

Then, the control device 8 acquires the front image FV that is output from the front imaging device 2 (Step ST102).

The signboard position detector 8*a* then detects the position of the signboard 300 in the acquired front image FV (Step ST103).

The control device 8 then acquires the sightline images LV (Step ST104).

Then, the sightline state detector 8*b* detects the sightline state (Step ST105).

Then, the first sightline determination unit 8*c* determines whether the sightline L is located at the signboard region SE corresponding to the signboard 300 in the front image FV (Step ST106).

Then, the signboard-information acquisition unit 8*d*, when it is determined that the sightline L is located at the signboard region SE (Yes at Step ST106), acquires the signboard information SI corresponding to the signboard 300 from the map information MI (Step ST107).

Then, the signboard-information determination unit 8*e* determines whether the signboard course information SCI is present in the signboard information SI (Step ST108).

Then, the control device 8, when it is determined that the signboard course information SCI is present in the signboard information SI by a signboard-information determination unit 8*e* (Yes at Step ST108), displays the signboard information SI on the display device 5 (Step ST109). The control device 8, as illustrated in FIG. 3, displays the signboard image SV corresponding to the signboard information SI on the display device 5. The signboard image SV may be, based on the signboard information SI, the same image as the signboard 300, an approximated image, a simplified image, or the same image as the field of view of the occupant 200.

Then, the second sightline determination unit 8f determines, as illustrated in FIG. 3, whether the sightline L is located at the signboard-course information region SCIE corresponding to the signboard course information SCI in the signboard information SI (Step ST110). The second sightline determination unit 8f, as illustrated in FIG. 3, displays the signboard image SV corresponding to the signboard information SI on the display device 5. In the signboard image SV, course images CV1 to CV8 corresponding to a plurality of pieces of signboard course information SCI1 to SCI8, respectively, are included.

Then, the selection unit 8g, when it is determined that the sightline L is located at the signboard-course information region SCIE (Yes at Step ST110), selects the signboard course information SCI corresponding to the signboard-course information region SCIE at which the sightline L is located (Step ST111). When, out of the signboard image SV, for example, the course image CV1 is visually recognized by the occupant 200, the signboard course information SCI1 is selected out of the signboard course information SCI1 to SCI8.

The control device 8 then changes the display form of the signboard information SI into the display form in which the selected signboard course information SCI can be identified (Step ST112). The control device 8, as illustrated in FIG. 4, performs the display control of the display device 5 so as to display, as the display form of the signboard information SI, the warning image WV superimposed on the course image CV corresponding to the signboard course information SCI. When the occupant 200 selected the signboard course information SCI1, an arrow that is larger than the arrow of the course image CV1 and different in color, as the warning image WV, is displayed being superimposed on the course image CV1 corresponding to the signboard course information SCI1, for example.

Then, the determination unit 8h, as illustrated in FIG. 5, determines whether the selected signboard course information SCI is visually recognized continuously (Step ST113). The determination unit 8h determines, as the input corresponding to the course change determination to the input unit, whether the time that the sightline L is located at the signboard-course information region SCIE corresponding to the signboard course information SCI selected by the occupant 200 exceeds a certain time (for example, a few seconds).

Then, the confirmation unit 8i, when it is determined that the selected signboard course information SCI is visually recognized continuously (Yes at Step ST113), notifies the occupant 200 of the course-change confirmation information XI (Step ST114). The confirmation unit 8i outputs the sound, such as "Is this the course you would like?", by the speaker 6 as the course-change confirmation information XI, for example.

Then, the voice recognition unit 8k determines whether the occupant 200 gave confirmation (Step ST115). The voice recognition unit 8k determines, by inputting the voice to the microphone 7 in order to select whether it is alright with the course based on the signboard course information SCI that the occupant 200 determined, whether the audio information is the information based on the intent that it is alright with the course based on the signboard course information SCI that the occupant 200 determined.

Then, the course change processor 8j, when it is determined that the occupant 200 gave the confirmation (Yes at Step ST115), performs the course change processing (Step ST116). The course change processor 8j generates the course information CI on the basis of the signboard course information SCI that the occupant 200 confirmed, and outputs the course information CI to the vehicle control ECU 9. The vehicle control ECU 9 performs the course control on the basis of the course information CI. Going straight is maintained. When the occupant 200 confirmed the signboard course information SCI1 out of the signboard course information SCI1 to SCI8, the course information CI corresponding to the signboard course information SCI1 is generated, and the vehicle control ECU 9 performs the course control that maintains the course that makes the vehicle 100 go straight, that is, the current course.

Furthermore, when it is determined that the sightline L is not located at the signboard region SE (No at Step ST106), when it is determined that the signboard course information SCI is not present in the signboard information SI by the signboard-information determination unit 8e (No at Step ST108), when it is determined that the sightline L is not located at the signboard-course information region SCIE (No at Step ST110), when it is determined that the selected signboard course information SCI is not visually recognized continuously (No at Step ST113), or when it is determined that the occupant 200 gave no confirmation (No at Step ST115), the present control period is ended and the processing moves on to the next control period.

As in the foregoing, in the vehicle control system 1 in the present embodiment, when the occupant 200 visually recognizes the signboard 300 and when the signboard course information SCI is included in the signboard information SI corresponding to the signboard 300, the signboard information SI is displayed on the display device 5 and, when the signboard course information SCI out of the signboard information SI is visually recognized continuously, the course information CI based on the signboard course information SCI is generated and the course control is performed on the basis of the course information CI by the vehicle control ECU 9. That is, with simple operation of visually recognizing the signboard 300 and visually recognizing the signboard course information SCI displayed on the display device 5, the occupant 200 can perform the course change processing. Accordingly, with the simple operation of the occupant 200, the course change can be performed automatically.

Furthermore, the vehicle control system 1 in the present embodiment, when the signboard course information SCI is included in the signboard information SI corresponding to the signboard 300, displays the signboard information SI on the display device 5, and the occupant 200 visually recognizes the signboard course information SCI displayed on the display device 5. Thus, even when the traveling vehicle 100 passes through the signboard 300, the occupant 200 can select the signboard course information SCI included in the signboard information SI. Accordingly, the occupant 200 can select the signboard course information SCI without visually recognizing the signboard 300 continuously. Thus, it is possible to prevent the occupant 200 from being upset in making the course change.

The vehicle control system 1 in the present embodiment, when the signboard course information SCI is selected, changes the display form of the signboard information SI displayed on the display device 5 into the display form in which the selected signboard course information SCI can be identified. Accordingly, when the occupant 200 started visually recognizing the course image CV corresponding to the signboard course information SCI, the signboard image SV corresponding to the signboard information SI is changed from the normal display form to the identification display form by superimposing the warning image WV on the course image CV. This enables the occupant 200 to grasp that the vehicle control system 1 is recognizing the course image CV corresponding to the signboard course information SCI that his/her own self started visually recognizing, and also to recognize that his/her own self started visually recognizing the course image CV.

In the vehicle control system 1 in the above-described embodiment, the sightline-state imaging device 3 has been used as an input unit. However, the present invention is not limited thereto, and the microphone 7 may be used as the input unit. FIG. 6 is a flow diagram of the vehicle control system according to a modification. Because the basic operation of the vehicle control system 1 in the modification is the same as or substantially the same as the basic operation of the vehicle control system 1 in the embodiment, the description of the same step is omitted or simplified.

The control device 8, as illustrated in FIG. 6, under the course control (Step ST201), acquires the front image FV (Step ST202), detects the position of the signboard 300 (Step ST203), acquires the sightline images LV (Step ST204), and detects the sightline state (Step ST205).

Then, the control device 8, when it is determined that the sightline L is located at the signboard region SE (Yes at Step ST206), acquires the signboard information SI corresponding to the signboard 300 from the map information MI (Step ST207) and, when it is determined that the signboard course information SCI is present in the signboard information SI (Yes at Step ST208), displays the signboard information SI on the display device 5 (Step ST209) and, when it is determined that the sightline L is located at the signboard-course information region SCIE (Yes at Step ST210), selects the signboard course information SCI corresponding to the signboard-course information region SCIE at which the sightline L is located (Step ST211) and changes the display form of the signboard information SI into the display form in which the selected signboard course information SCI can be identified (Step ST212).

Then, the determination unit 8h determines whether the occupant 200 made the determination (Step ST213). The control device 8, when acquired the audio information by inputting the voice to the microphone 7, determines whether it is the audio information based on the intent of determining the course change as the input corresponding to the course change determination of the occupant 200 such as "I'll take this course" and "Head there, please", for example.

The control device 8 then determines that the occupant 200 made the determination (Yes at Step ST213), notifies the occupant 200 of the course-change confirmation information XI (Step ST214), determines that the occupant 200 gave the confirmation (Yes at Step ST215), and performs the course change processing (Step ST216).

When it is determined that the occupant 200 has not made the determination (No at Step ST213), the present control period is ended, and the processing moves on to the next control period.

As in the foregoing, in the vehicle control system 1 in the modification, when the occupant 200 visually recognizes the signboard 300 and when the signboard course information SCI is included in the signboard information SI corresponding to the signboard 300, the signboard information SI is displayed on the display device 5 and, when the occupant 200 determined the selected signboard course information SCI by the voice, the course information CI based on the signboard course information SCI is generated and the course control is performed on the basis of the course information CI by the vehicle control ECU 9. That is, with simple operation of visually recognizing the signboard 300 and uttering the voice in response to the signboard course information SCI displayed on the display device 5, the occupant 200 can perform the course change processing. Accordingly, with the simple operation of the occupant 200, the course change can be performed automatically.

The vehicle control system 1 in the present embodiment may determine the selected signboard course information SCI on the basis of the sightline L by using the sightline-state imaging device 3 as the input unit. The control device 8 may determine the selected signboard course information SCI on the basis of whether the eyes are closed as the sightline state, for example.

In the vehicle control system 1 in the present embodiment, when displaying the signboard image SV on the display device 5, a cancel image PV for ending the operation of the course change may be displayed being superimposed on the signboard image SV, as illustrated in FIG. 3 and FIG. 4. In this case, the second sightline determination unit 8f determines whether the sightline L is located at a cancel image region PVE where the cancel image PV in the signboard information SI is displayed, and when it is determined that the sightline L is located at the cancel image region PVE, notifies the occupant 200 of cancel confirmation information YI. The control device 8 outputs by the speaker 6 the sound, such as "Is it OK to cancel?" and "Want to close the screen?", as the cancel confirmation information YI, for example. The control device 8 determines whether the occupant 200 gave the confirmation. The voice recognition unit 8k determines, by inputting the voice to the microphone 7 in order to select whether it is alright for the occupant 200 to end the operation of the course change, whether the audio information is the information based on the intent that it is alright for the occupant 200 to end the operation of the course change, and when the occupant 200 gives the confirmation, the operation of the course change is ended.

In the vehicle control system 1 in the present embodiment, when the signboard course information SCI out of the signboard image SV displayed on the display device 5 is selected, a warning image WV' corresponding to sub information SBI based on the selected signboard course information SCI may be displayed being superimposed on the signboard image SV, as illustrated in FIG. 4. The sub information SBI is the information concerning the course based on the selected signboard course information SCI, and includes service areas on the course, junctions, names of exits, distances, and others, for example. By displaying the sub information SBI on the display device 5, the occupant 200 can obtain the information on the course when determining the course change, and thus can determine the course change easily.

In the vehicle control system 1 in the present embodiment, by selecting the signboard course information SCI out of the signboard information SI displayed on the display device 5 by the occupant 200, the course change is performed. However, when destination information GI is included in the signboard information SI, by selecting the destination information GI, the destination of the navigation device 4 may be changed. Furthermore, when the vehicle control ECU 9 can acquire the destination information including route information from the navigation device 4, automatic travel control based on the route to the destination may be performed.

The vehicle control system according to the present embodiment has an effect in that the course change can be performed automatically with simple operation of the occupant.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control system comprising:
   a front imaging device configured to image a front of a vehicle to capture a front image;
   a signboard position detector configured to detect, based on the front image, a position of a signboard in the front image;
   a sightline-state imaging device configured to image eyes of an occupant of the vehicle to capture a sightline image;
   a sightline state detector configured to detect, based on the sightline image, a sightline of the eyes of the occupant;
   a first sightline determination unit configured to determine, based on the position of the signboard in the front image and on the sightline of the eyes of the occupant, whether the sightline is located at a signboard region corresponding to the signboard in the front image;
   a signboard-information acquisition unit configured to acquire, upon a determination that the sightline is located at the signboard region, signboard information corresponding to the signboard from map information;
   a signboard-information determination unit configured to determine whether the acquired signboard information includes signboard course information that is one or more pieces of information on a course of the vehicle;
   a display device configured to display, upon a determination that the signboard information includes the signboard course information, the signboard course information;
   a second sightline determination unit configured to determine, based on the signboard information displayed on the display device and the sightline of the eyes of the occupant, whether the sightline is located at a signboard-course information region corresponding to the signboard course information in the signboard information;
   a selection unit configured, upon a determination that the sightline is located at the signboard-course information region by the second sightline determination unit, to select the signboard course information corresponding to the signboard-course information region at which the sightline of the eyes of the occupant is located;
   an input unit configured, upon a determination that the selected signboard-course information corresponds to a course change, to receive an input from the occupant confirming the course change; and
   a course change processor configured, upon a determination that the input confirming the course change has been received by the input unit, to perform course change processing based on the signboard course information.

2. The vehicle control system according to claim 1, wherein
   when the signboard course information is selected, the display device changes a display form of the signboard information into the display form in which the selected signboard course information is identifiable.

* * * * *